Dec. 29, 1931.  A. PRITCHARD ET AL  1,839,177
MANUFACTURE OF TENNIS AND OTHER RACKETS
Filed Oct. 11, 1930   4 Sheets-Sheet 3
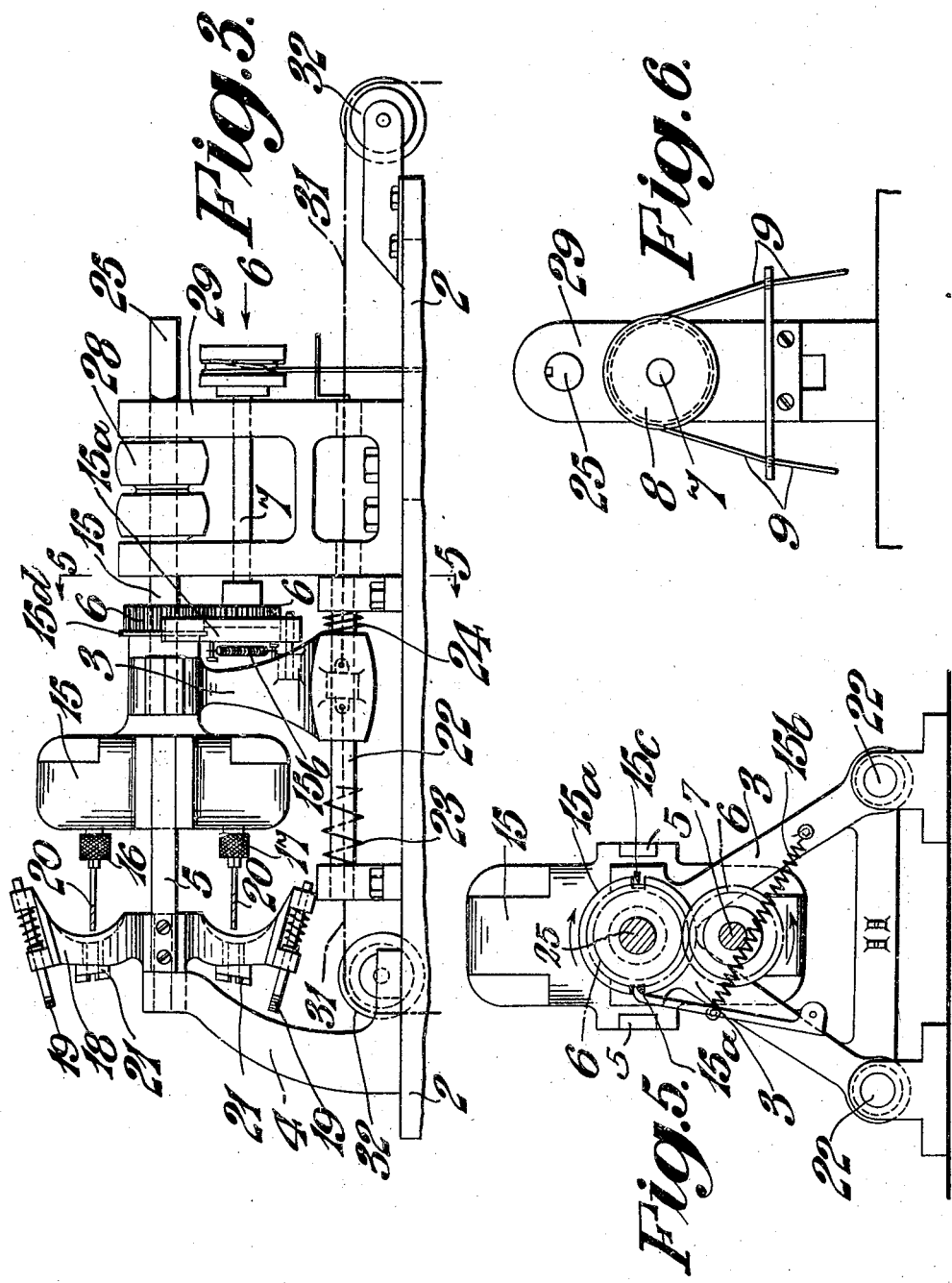
INVENTORS
A. PRITCHARD & G. MONK.
BY Blair & Kilgore
ATTYS

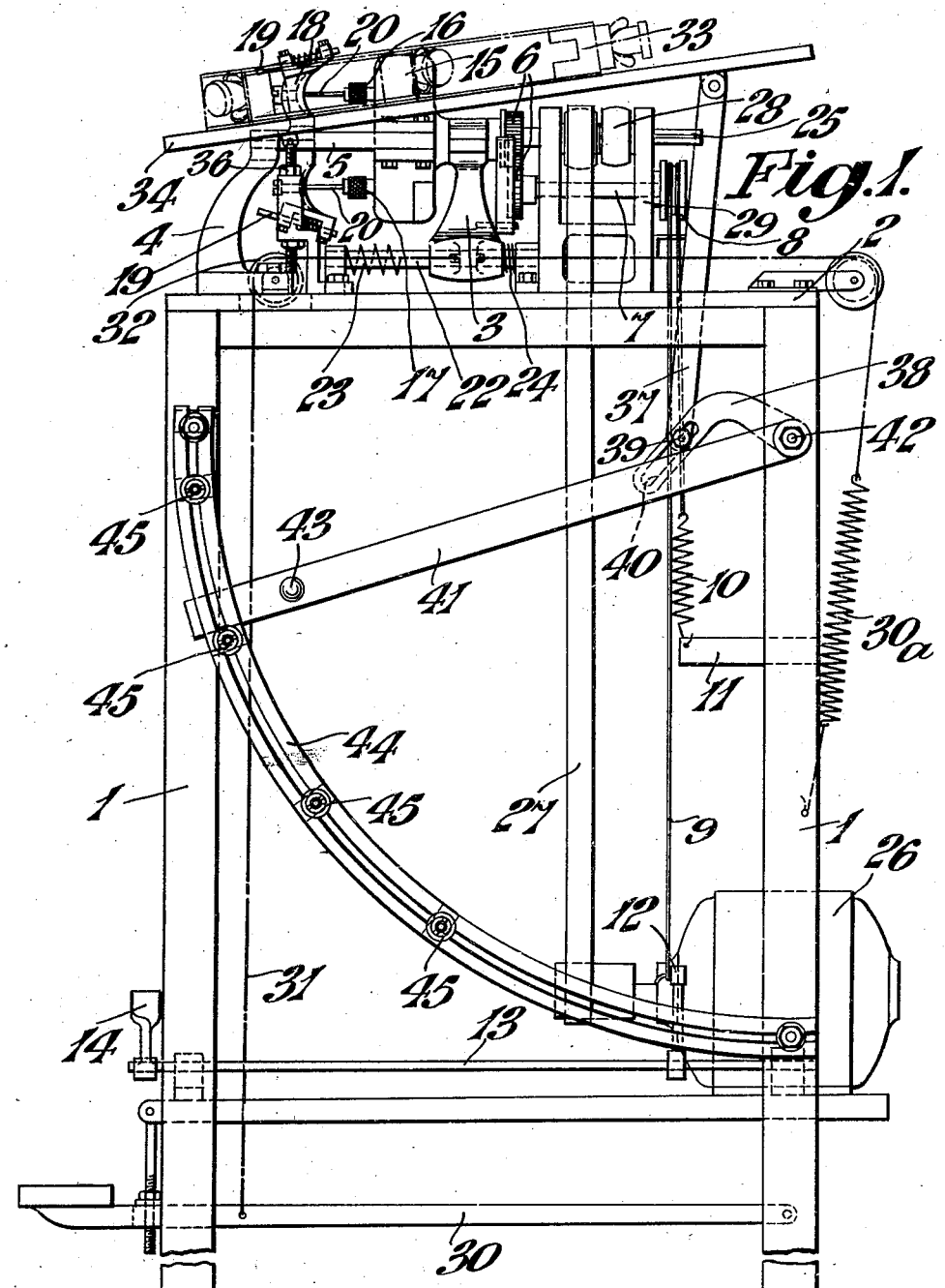

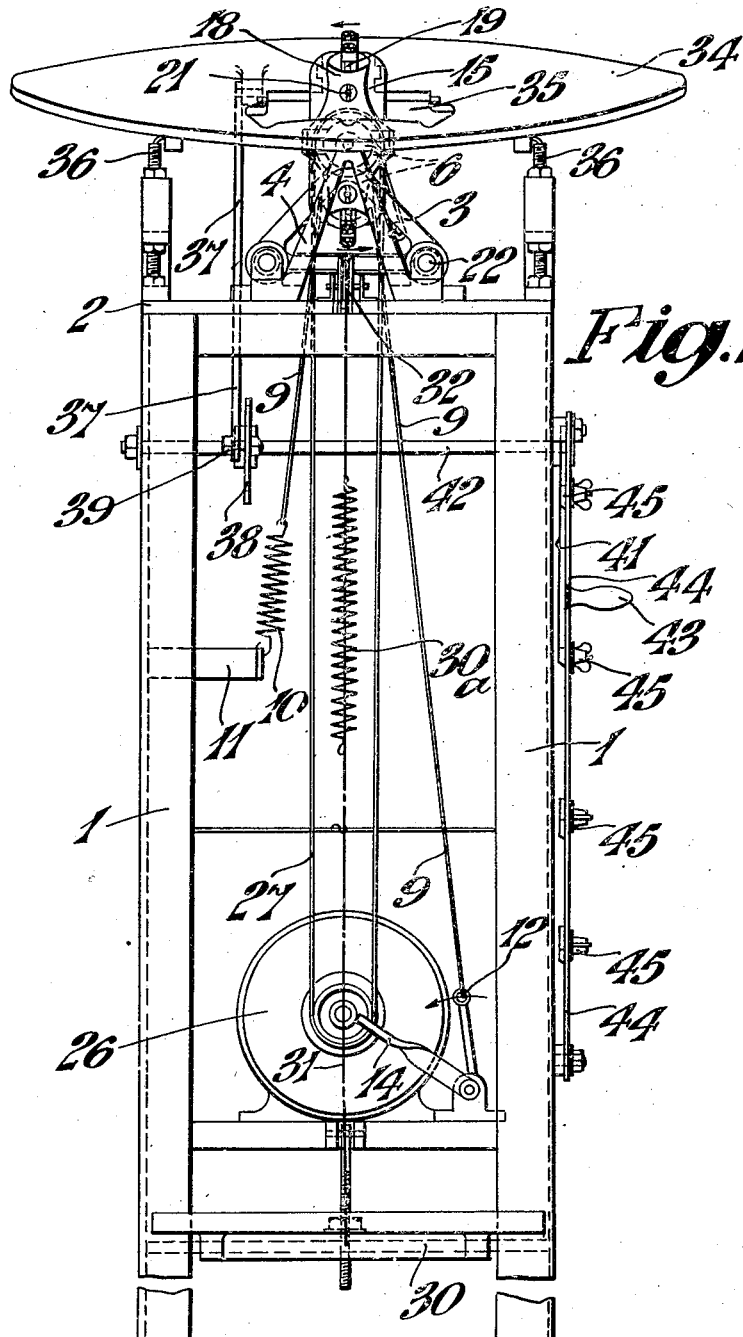

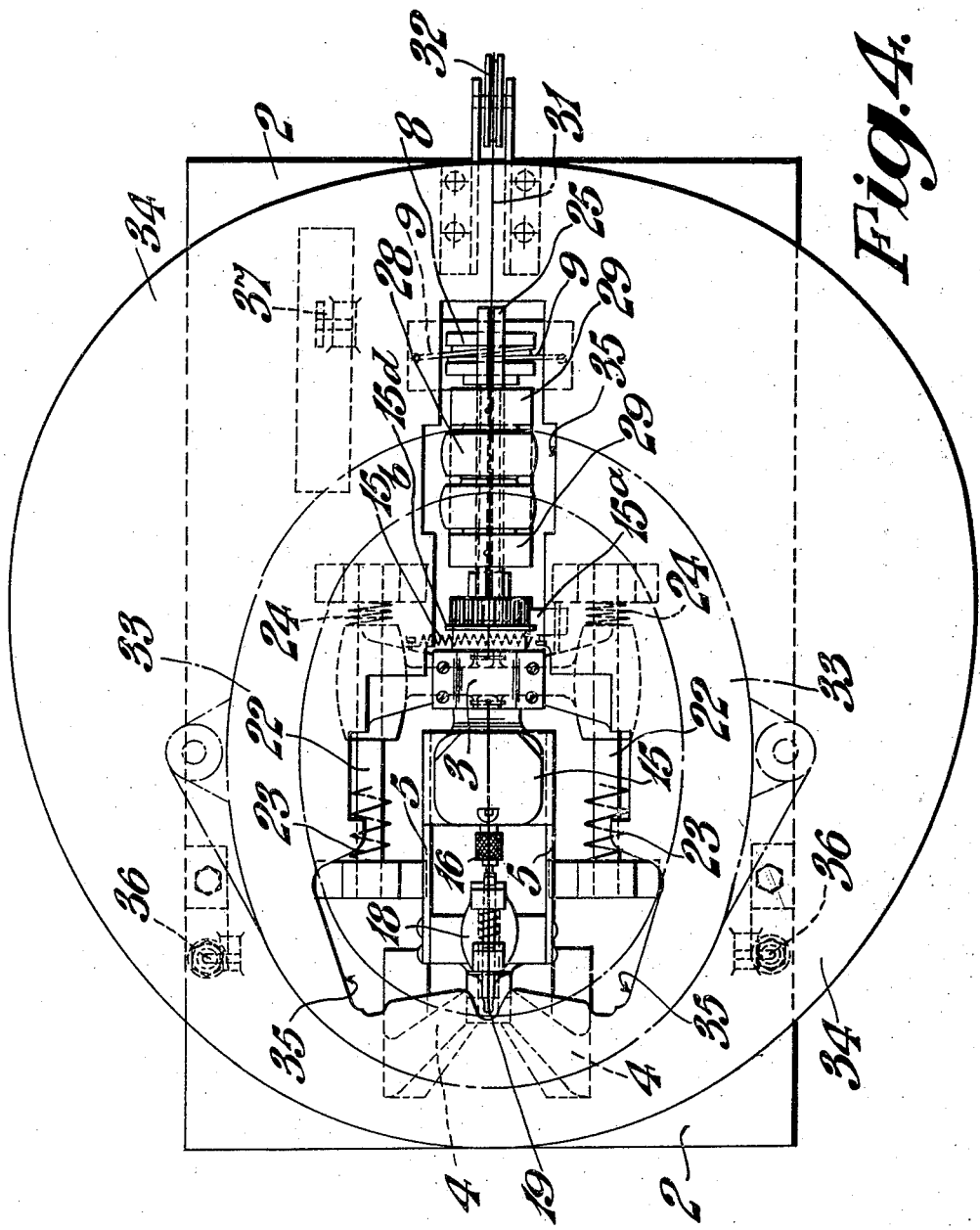

Patented Dec. 29, 1931

1,839,177

UNITED STATES PATENT OFFICE

ARTHUR PRITCHARD AND CHARLES MONKS, OF LONDON, ENGLAND

MANUFACTURE OF TENNIS AND OTHER RACKETS

Application filed October 11, 1930, Serial No. 488,164, and in Great Britain September 30, 1930.

This invention relates particularly to the drilling of the string holes in the frames of tennis and other rackets and is an improvement in or modification of the invention described and claimed in the specification of our prior Patent No. 1,779,289 dated October 21, 1930.

The invention according to such prior application consisted of an apparatus for drilling the string holes in the frames of tennis and other rackets which comprised a drill spindle, means for supporting each frame relatively to the drill spindle to ensure predetermined lateral spacing of the drill holes from the sides of the frame, for example, a jig of suitable width, and means for controlling the movement of the frame from one drilling position to another drilling position to ensure predetermined longitudinal spacing of the holes from each other around the frame.

Whilst the invention according to such prior application was not limited in the matter of the number of drill spindles used the embodiment illustrated and described disclosed but a single drill spindle and with such an arrangement to complete the drilling operation on, for example, a tennis racket it was necessary to change the drill to one of a different size or alternatively to employ two machines each adapted to drill a hole of a different size.

The object of the present invention is to remove this disadvantage and to produce a machine capable of completing the whole of the drilling operation on a tennis or other racket frame.

Broadly the present invention consists of an apparatus of the type described in such prior application in which a rotatable drill head is provided having two or more drill spindles with means for revolving said drill head so as to bring each drill spindle in turn into the drilling position and further means for holding the same in such drilling position during the drilling operation.

In the specification of said prior application two different means were described for controlling the movement of the frame from one drilling position to another drilling position and whilst the same means may be employed in the improved apparatus according to the present invention it is preferred to use the first of such described means, namely, a spring pressed finger mounted upon a bracket above the drill beyond which it extends forwardly for a predetermined distance such finger being adapted to co-act by engaging in each of a plurality of notches around the frame holding jig. In the preferred arrangement according to the present improvement one of such fingers is provided for each drill spindle and the bracket or spider carrying the same is mounted in fixed location with the drill head and so as to be rotatable therewith.

In order that the invention may be clearly understood and carried into effect an embodiment of the same will now be described by aid of the accompanying drawings in which:—

Fig. 1 is a side elevation of a complete machine according to the present invention.

Fig. 2 is a front elevation of the same.

Fig. 3 is a side elevation of the drilling part of the apparatus to a somewhat larger scale than that shown in Fig. 1 with part of the apparatus removed for the sake of clearness.

Fig. 4 is a plan view of the complete apparatus to the same scale as Fig. 3.

Fig. 5 is a section on the line 5—5 in Fig. 3.

Fig. 6 is an end view looking in the direction of the arrow 6 in Fig. 3.

The apparatus illustrated in the drawings comprises a frame 1 having a table top 2 upon which the drilling portion of the apparatus is mounted. This drilling portion comprises brackets 3 and 4 which support between them a drill head and a spider connected by a pair of spaced parallel bars 5 which are slidably engaged by the drill head and fixed to the spider so that the drill head is free to move relatively to the spider during the feeding movement of the drills, the spider however being rotated with the drill head by the connection afforded by said bars 5. This drill head is operatively connected through gearing 6 to a spindle 7 at the outer end of which is mounted a pulley 8 over which runs a belt 9 one end of such belt being connected to a spring 10 which is anchored to a bracket 11 and the opposite end, being attached by one end to a lever 12. This lever 12 is fixedly mounted upon a shaft 13 situated near the lower end of the frame 1 the outer end of such shaft carrying a pedal 14 whereby the shaft 13 and, through the pulley 8, the shaft 7 are partially rotated, such movement being imparted through the gearing 6 to the drill head and spider as above mentioned. The drill head which is indicated at 15 carries two drill spindles 16 and 17 and in advance of such drill head is situated the spider 18 which is in the form of a two armed bracket carrying at the extremity of each arm a spring controlled finger 19. Upon operation of the pedal 14 this drill head and the bracket or spider 18 are turned to bring the required drill spindle into the drilling position in which position it is retained by means of a detent 15$^a$ which is pulled by a spring 15$^b$ into engagement with notches 15$^c$ cut in the periphery of and on diametrically opposite sides of a flange 15$^d$. In addition to serving as a carrier for the fingers 19 the bracket or spider 18 also serves as a guide for the drills 20 carried by each of the drill spindles 16 and 17 for which purpose such bracket or spider is provided with bushes 21.

The bracket 3 which carries the drill head 15 is not mounted directly upon the table top 2 as is the bracket 4 which supports the spider 18 but is carried by and is slidably mounted upon a pair of parallel guide bars 22, the longitudinal movement in either direction along such guide bars being controlled by springs 23 and 24. Such movement of the bracket 3 serves to carry the drill head 15 towards the spider 18 for the purpose of feeding the drills into a positioned tennis racket or other frame.

The drill spindles are driven simultaneously through suitable gearing, not illustrated, arranged within the drill head, from a spindle 25 such spindle in turn being driven from a motor 26 through the medium of a belt 27 and fast and loose pulleys 28 arranged within a headstock 29 which forms a bearing for said spindle 25.

The forward feeding movement of the drill head 15 is imparted by the depression of a foot operated lever 30 through the medium of a chain or other flexible connection 31 which at its upper end passes over a guide pulley 32 to an attachment on the bracket 3. The return movement of the drill head is effected automatically upon the release of the foot operated lever 30 by a spring 30$a$ which is sufficiently powerful as to overcome the spring 24 which acts as a cushion for the bracket 3.

The work to be drilled is first mounted within a suitable jig 33, see Fig. 1, which may be the same or similar to that described in the specification of our prior application before referred to and such jig with the contained frame is placed upon an inclined table 34 so as to surround the upper end of the drill head 15 and the bracket or spider 18, the inclination of the table being arranged to suit the required angularity of the holes to be drilled.

The table 34, which is cut away as at 35 to accommodate the projecting ends of the drill head and the bracket or spider, is supported at its front end by means of a pair of vertically adjustable supports 36 and at its rear end by means comprising an arm 37, a further bent arm 38 with which it engages through the medium of a pin 39 and slot 40, and a further arm 41 mounted with the bent arm 38 on a common pivot pin 42, in other words the members 41 and 38 are separately fixed to the spindle 42 and such spindle is pivoted in the frame of the machine. The outer end of the arm 41 is provided with a handle 43 by means of which the arm 41 is raised or lowered about its pivot 42 such outer end being arranged to co-operate with a radius guide 44 provided with adjustable and predeterminedly spaced stops 45 which stops serve to hold the arm 41 in the adjusted positions. When the arm 41 is in its fully raised position the inclination of the table 34 is at its maximum and when the arm 41 is in its lowest position the table 34 is substantially or exactly horizontal. It will thus be seen that by means of the present invention we have provided an improved apparatus by means of which holes of different sizes and varying angularity may be drilled in tennis rackets and other frames without necessitating the removal of such frame from the machine.

We claim:
Apparatus for drilling the string holes in the frame of tennis rackets and the like comprising in combination an adjustable supporting table, means for tilting the same to any desired angle, a longitudinally movable and rotatable drill head, a plurality of independently rotatable drill spindles carried by said drill head, a longitudinally immovable multi-armed bracket mounted in advance of and rotatable with said drill head, spring controlled fingers carried by each of the arms of said bracket, drill guides carried by said arms, means for rotating the drill spindles in the drill head, means for intermittently rotating said drill head and bracket for the purpose of bringing each of the drill spindles in turn into the drilling position and further means actuated by the operator for longitudinally moving the drill head towards the said bracket so as to cause a positioned drill to pass through one of the guides carried by said bracket and to feed into a positioned racket or like frame.

Signed at London, England, this second day of October, 1930.

ARTHUR PRITCHARD.
CHARLES MONKS.